US009343784B2

(12) United States Patent
Wayne et al.

(10) Patent No.: US 9,343,784 B2
(45) Date of Patent: May 17, 2016

(54) BATTERY PACK ASSEMBLY HAVING THERMAL TRANSFER SHEETS AND HEAT SINK

(75) Inventors: Ryan J. Wayne, Brecksville, OH (US); Jonathan Andrew Taylor, Cleveland, OH (US); Martin David Smalc, Parma, OH (US)

(73) Assignee: GrafTech International Holdings Inc., Independence, OH (US)

( * ) Notice: Subject to any disclaimer, the term of this patent is extended or adjusted under 35 U.S.C. 154(b) by 64 days.

(21) Appl. No.: 14/235,532

(22) PCT Filed: Aug. 13, 2012

(86) PCT No.: PCT/US2012/050551
§ 371 (c)(1),
(2), (4) Date: Jan. 28, 2014

(87) PCT Pub. No.: WO2013/025595
PCT Pub. Date: Feb. 21, 2013

(65) Prior Publication Data
US 2014/0154549 A1     Jun. 5, 2014

Related U.S. Application Data

(60) Provisional application No. 61/523,365, filed on Aug. 14, 2011.

(51) Int. Cl.
*H01M 2/02*     (2006.01)
*H01M 2/04*     (2006.01)
(Continued)

(52) U.S. Cl.
CPC ........ *H01M 10/5055* (2013.01); *H01M 2/1077* (2013.01); *H01M 10/613* (2015.04);
(Continued)

(58) Field of Classification Search
CPC ..... H01M 2/10; H01M 2/1077; H01M 10/50; H01M 10/5004; H01M 10/5016; H01M 10/5012; H01M 10/5046; H01M 10/5055; H01M 10/625; H01M 10/615; H01M 10/60
See application file for complete search history.

(56) References Cited

U.S. PATENT DOCUMENTS 6,528,199 B1    3/2003    Mercuri et al.
7,531,270 B2    5/2009    Buck et al.
(Continued)

FOREIGN PATENT DOCUMENTS

EP           1783097 A1     5/2005

OTHER PUBLICATIONS

USPTO, International Search Report and Written Opinion for PCT/US12/50551, Mailed Oct. 22, 2012.
(Continued)

*Primary Examiner* — Kenneth Douyette
(74) *Attorney, Agent, or Firm* — Rankin, Hill & Clark LLP

(57) ABSTRACT

A battery pack thermal management assembly draws heat from prismatic batteries having opposed major surfaces and arranged in a stacked configuration inside a housing. The thermal management assembly includes a plurality of thermal transfer sheets made from sheets of a compressed mass of exfoliated graphite particles. Each thermal transfer sheet is positioned to contact the major surface of at least one of the prismatic batteries. A cover plate has a top face and a bottom face and includes a plurality of apertures through which the plurality of thermal transfer sheets extend. The apertures include at least one curved sidewall and the thermal transfer sheets are bent over the curved sidewall. At least a portion of each of the thermal transfer sheets is secured between a heat sink and the top face.

19 Claims, 3 Drawing Sheets

(51) Int. Cl.
*H01M 2/20* (2006.01)
*H01M 10/50* (2006.01)
*H01M 10/02* (2006.01)
*H01M 10/6555* (2014.01)
*H01M 2/10* (2006.01)
*H01M 10/625* (2014.01)
*H01M 10/647* (2014.01)
*H01M 10/6551* (2014.01)
*H01M 10/613* (2014.01)

(52) U.S. Cl.
CPC .......... *H01M10/625* (2015.04); *H01M 10/647* (2015.04); *H01M 10/6551* (2015.04); *H01M 10/6555* (2015.04); *H01M 2250/20* (2013.01); *Y02T 90/32* (2013.01); *Y10T 29/4935* (2015.01)

(56) References Cited

U.S. PATENT DOCUMENTS

| | | |
|---|---|---|
| 2001/0007728 A1 | 7/2001 | Ogata et al. |
| 2006/0214641 A1* | 9/2006 | Cho .............................. 320/150 |
| 2010/0314081 A1 | 12/2010 | Reis et al. |
| 2011/0070474 A1 | 3/2011 | Lee et al. |
| 2013/0209858 A1 | 8/2013 | Schmitt et al. |

OTHER PUBLICATIONS

USPTO, International Preliminary Report on Patentability for PCT/US12/50551, Mailed Feb. 18, 2014.

* cited by examiner

BATTERY PACK ASSEMBLY HAVING THERMAL TRANSFER SHEETS AND HEAT SINK

BACKGROUND

Batteries and cells are important energy storage devices well known in the art. The batteries and cells typically comprise electrodes and an ion conducting electrolyte positioned therebetween. Battery packs that contain lithium ion batteries are increasingly popular for automotive applications and various commercial electronic devices because they are rechargeable and have little or no memory effect. Storing and operating the lithium ion battery at an optimal operating temperature is very important to allow the battery to maintain a charge for an extended period of time.

Opportunities exist to improve upon prior battery pack assemblies to improve operating temperatures to ensure the longest possible life cycle, rated capacity, and nominal charge and discharge rates.

SUMMARY OF THE EMBODIMENTS

According to one aspect, a battery pack thermal management assembly is provided for drawing heat from a plurality of generally rectangular prismatic batteries having opposed major surfaces and arranged in a stacked configuration inside a housing. The thermal management assembly includes a plurality of thermal transfer sheets made from sheets of compressed expanded natural graphite. Each thermal transfer sheet is positioned to contact the major surface of at least one of the prismatic batteries. A cover plate has a top face and a bottom face and includes a plurality of apertures through which the plurality of thermal transfer sheets extend. The apertures include at least one curved sidewall and the thermal transfer sheets are bent over the curved sidewall. At least a portion of each of the thermal transfer sheets is secured between a heat sink and the top face.

According to another aspect, a method is disclosed for forming a thermal management system for a battery pack which includes a plurality of generally rectangular prismatic batteries having opposed major surfaces and arranged in a stacked configuration inside a housing. The method includes positioning a thermal transfer sheets in contact with the major surface of at least one of the prismatic batteries. The thermal transfer sheet is made from a sheet of compressed expanded natural graphite. A cover plate is placed over the housing. The cover plate includes at least one aperture and the thermal transfer sheet extends through the aperture. The aperture includes a curved sidewall. The thermal transfer sheet is bent over the curved sidewall and a heat sink is secured to the cover plate to hold at least a portion of the thermal transfer sheet between the heat sink and the cover plate.

DETAILED DESCRIPTION OF THE EMBODIMENTS

Figure 1:
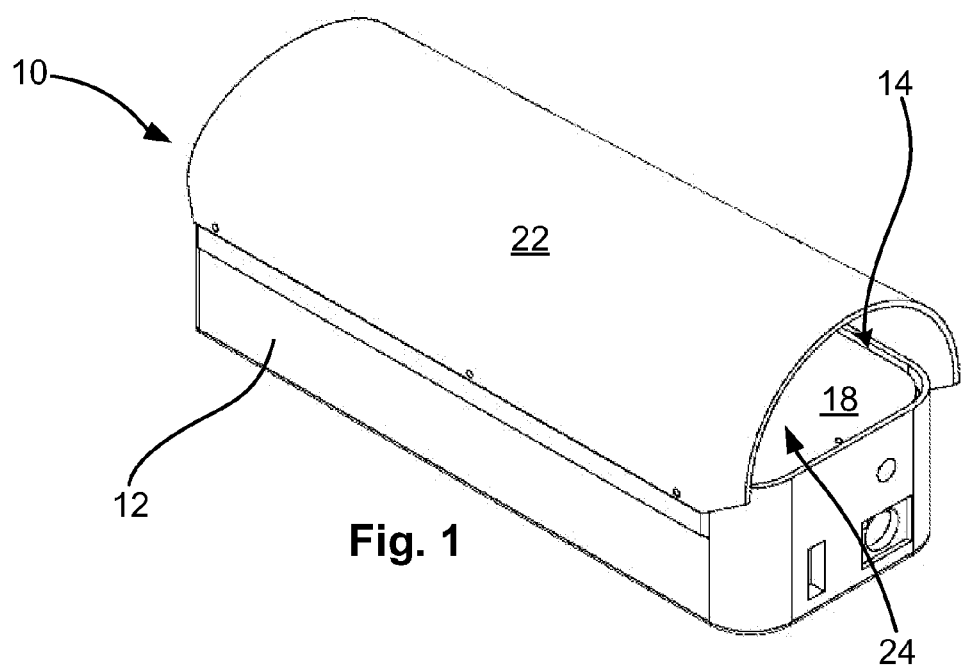
FIG. 1 is an isometric view of a battery pack assembly.
Figure 2:
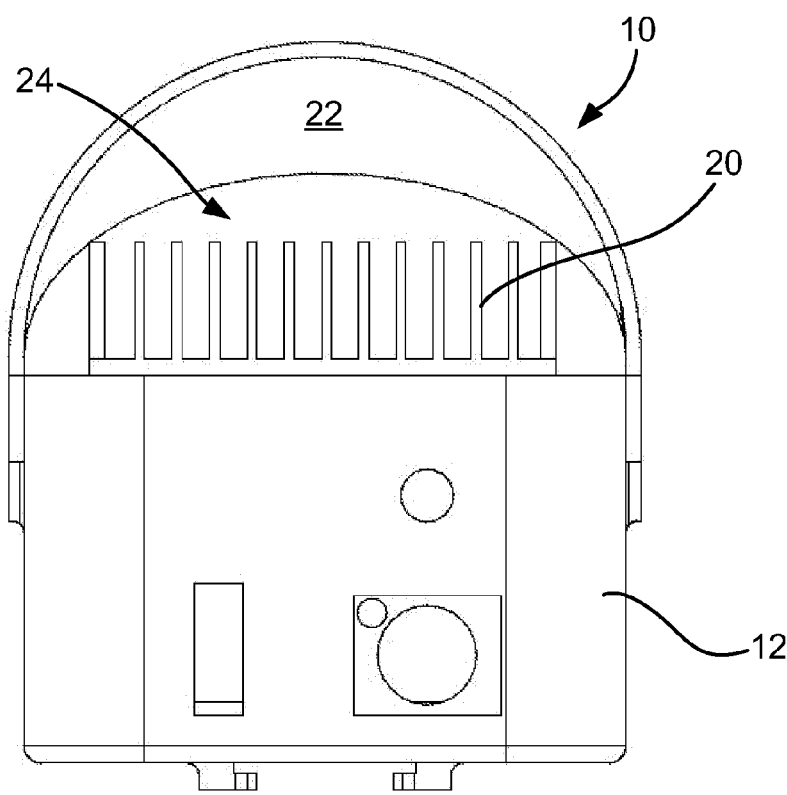
FIG. 2 is an front view of the battery pack assembly.

Large format prismatic lithium-ion cells have certain advantages over conventional prismatic or cylindrical cells. Their large, planar shape not only results in higher energy density, but also substantially simplifies the design, construction and thermal management of multi-cell packs. Electrically, a battery pack assembly is made by assembling a plurality of prismatic lithium-ion cells in series to add up voltage, or in parallel which increases capacity.

In one embodiment, the prismatic lithium-ion cell is generally rectangular or square shaped and has a thickness of from about 1 mm to about 10 mm. More preferably, the cell has a thickness of from about 3 mm to about 6 mm. In one embodiment of the battery pack, the prismatic lithium-ion cell has opposed major surfaces, each major surface footprint being at least 8 square inches, more preferably a footprint of at least 16. In one embodiment, the footprint is from about 49 square inches to about 400 square inches. In another embodiment, the footprint is from about 16 square inches to about 2500 square inches and the most preferably a footprint is from about 400 square inches to about 1600 square inches.

The case of each battery cell may be made of a hardened metal and/or plastic casing. Alternately, the case may be aluminum foil-laminated plastic film. The battery cell case is preferably made with aluminum foil-laminated plastic film, which has a thickness of from about 20 µm to about 200 µm. More preferably, the aluminum foil-laminated plastic film has a thickness of from about 30 µm to about 100 µm. Most preferably, aluminum foil-laminated plastic film has a thickness of from about 40 µm to about 50 µm. The positive electrode may be a lithium-ion positive electrode, the negative electrode may be a lithium-ion negative electrode and the electrolyte may be a lithium-ion electrolyte. Further, the electrolyte may be a liquid lithium-ion electrolyte or a polymer lithium-ion electrolyte.

Preferably, the lithium-ion cell has a specific energy density of greater than 200 wh/kg, more preferably greater than 210 wh/kg and the most preferably about 220 wh/kg or greater. In yet another embodiment, the large format lithium-ion cell has an energy density of at least 450 wh/L, preferably at least 500 wh/L, more preferably at least 510 wh/L and most preferably at least 520 wh/L. In still another embodiment, the large format lithium-ion battery pack has an energy storage capacity of at least 0.5 kWh, more preferably 4 kWh, even more preferably 16 kWh, still more preferably at least 24 kWh, more preferably at least 53 kWh and most preferably at least 100 kWh.

As used herein, the term "cell" or "battery cell" means an electrochemical cell made of at least one positive electrode, at least one negative electrode, an electrolyte, and a separator membrane. The term "cell" and "battery cell" are used interchangeably. The "battery" or "battery pack" means an electric storage device made of more than two cells. The terms "battery" and "battery pack" are used interchangeably.

Large format prismatic cells are advantageously assembled into battery packs in a stacked configuration, wherein the major surfaces of each cell are facing the major surfaces of adjacent cells. This stacked arrangement maximizes the energy density, but is not conducive to transferring the heat away from the cells. This is particularly true of the interior cells of the battery pack located relatively far from one of the exterior surfaces of the battery pack. To facilitate heat transfer, thermally conducting sheets or plates "thermal transfer sheets" can be inserted in the spaces between the stacked prismatic cells. The thermal transfer sheets improve performance and life of the cells by reducing thermal gradients in the plane of the sheet and transporting heat directly to the surroundings of the pack or to a heat sink.

With reference now to FIG. 1, a battery pack assembly is shown and generally indicated by the numeral 10. Assembly 10 includes a generally rectangular main housing 12 which forms an interior volume accessible via a top opening 14. As will be described in greater detail herein below, a plurality of battery cells 16 are positioned within the interior volume of housing 12. A cover plate 18 is positioned at top opening 14 to substantially enclose the interior volume of main housing 12. Cover plate 18 may be secured to housing 12 by any appropriate means. Both housing 12 and cover plate 18 are advantageously made from materials capable of withstanding the vibrations and shocks typically encountered in a vehicle.

A heat sink 20 is positioned on top of cover plate 18. In one embodiment, heat sink is finned. In this or other embodiments, heat sink 20 may be made from a thermally conductive metal including, for example, copper or aluminum. In other embodiments, the heat sink 20 may be made from a graphite based material. In still further embodiments, heat sink may be made from compressed expanded natural graphite. In this or other embodiments, the compressed expanded natural graphite may be resin impregnated. In this or other embodiments, heat sink 20 may include phase change materials encapsulated therein. In other embodiments, heat sink 20 may comprise a cold plate or manifold through with a thermal transfer fluid flows. In still other embodiments, heat sink 20 may comprise the external surface or housing of a device.

A protective cover 22 extends longitudinally along the top 14 of main housing 12. Cover 22 may be generally semicircular in cross-section and tapered in the longitudinal direction. As can be seen, an air channel 24 is formed between protective cover 22 and cover plate 18. In this manner, air or other gasses may be directed through the channel 24 to draw thermal energy away from heat sink 20.

Figure 3:
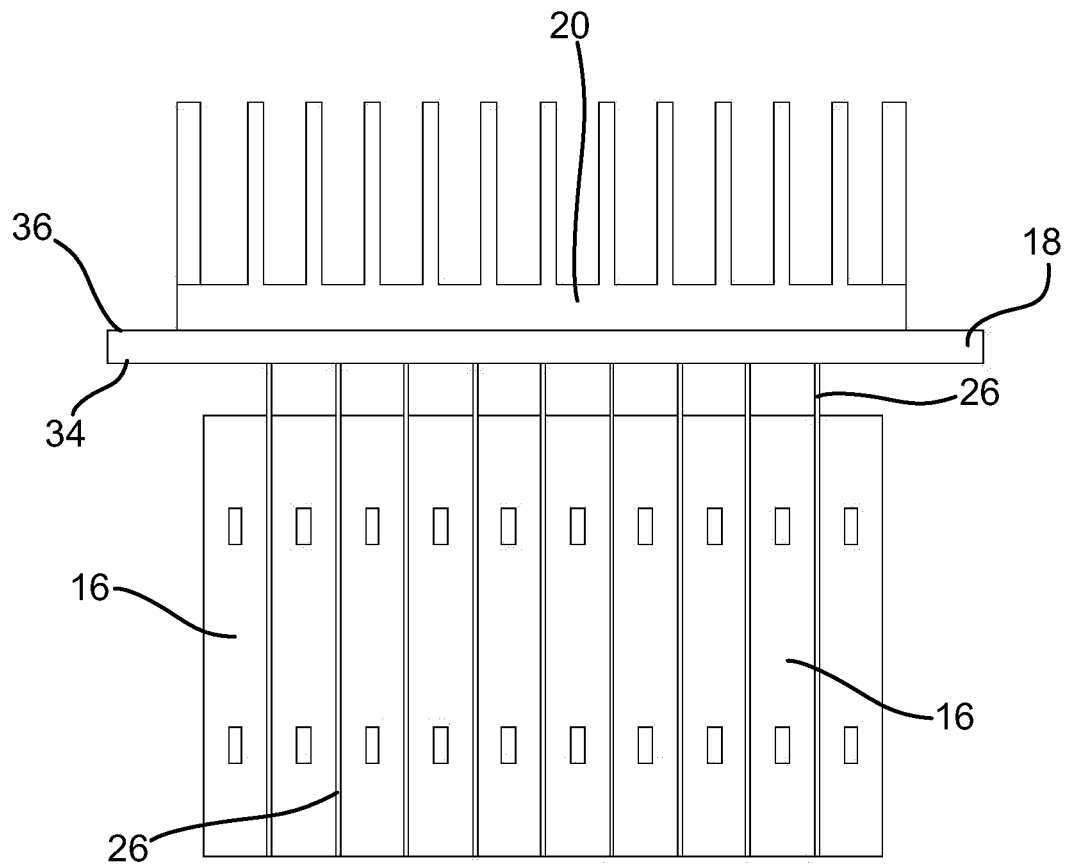
FIG. 3 is a front view of the battery pack assembly with the housing and protective cover removed.
Figure 4:
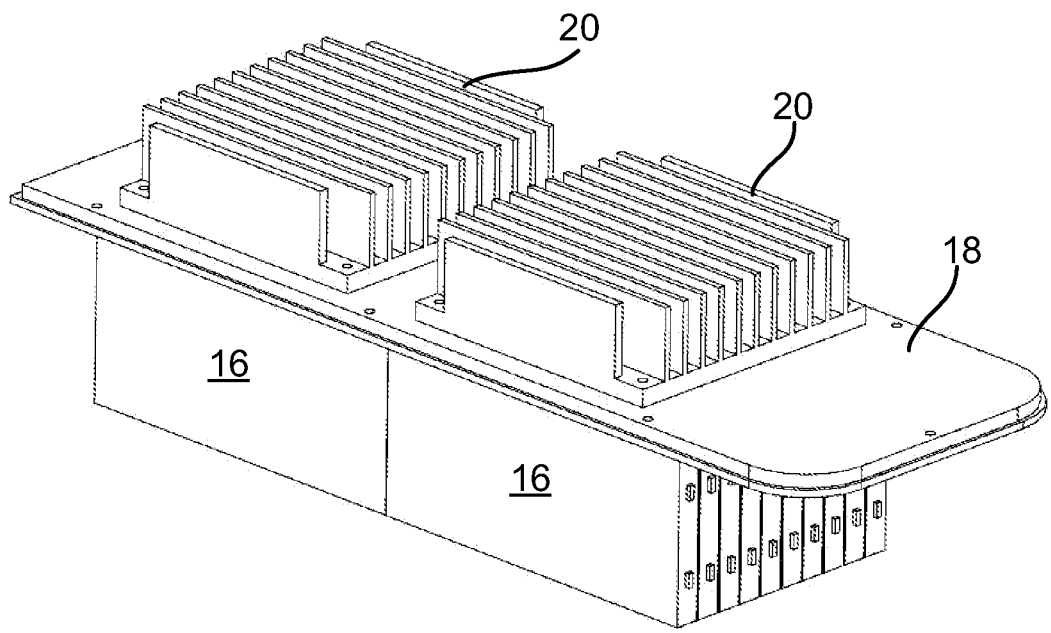
FIG. 4 is an isometric view of the battery pack assembly with the housing and protective cover removed.

With reference now to FIGS. 3 and 4, housing 12 and protective cover 22 are removed to more clearly show the interior of housing 12. As can be seen, a plurality of battery cells 16 are arranged in a stacked configuration inside housing 12. In the embodiment shown, a pair of battery cell stacks are positioned adjacent to one another. However, it should be appreciated that other stack arrangements are contemplated. For example, the battery pack assembly 10 may include a single stack or more than two stacks. In one embodiment, each battery cell stack includes an associated heat sink 20 in operative thermal contact therewith. However, it should be appreciated that a single heat sink 20 may be configured and sized to be in operative thermal contact with more than one battery cell stack.

A graphite based thermal transfer sheet 26 is positioned between at least two adjacent battery cells 16 in each stack. Advantageously, as shown in FIG. 3, the thermal transfer sheet 26 is positioned between each battery cell 16 in a stack. In still further embodiments, a thermal transfer sheet 26 is positioned between every other battery cell 16 in each stack. In these or other embodiments, the thermal transfer sheet 26 is in contact with at least 70 percent of the major surface of the battery cell 16 facing the thermal transfer sheet 26. In other embodiments, the thermal transfer sheet 26 is in contact with at least 90 percent of the major surface of the battery cell 16 facing the thermal transfer sheet 26. In still further embodiments, the thermal transfer sheet 26 is in contact with substantially the entire major surface of the battery cell 16 facing the thermal transfer sheet 26.

Each thermal transfer sheet 26 may be optionally thin and sheet-like, having two opposed major surfaces. In one embodiment, the thermal transfer sheet 26 may be less than about 2 mm thick. In other embodiments the thermal transfer sheet 26 may be less than about 1 mm thick. In still other embodiments, the thermal transfer sheet may be less than about .5 mm thick. According to one or more embodiments, thermal transfer sheet 26 may be a sheet of a compressed mass of exfoliated graphite particles, a sheet of graphitized polyimide or combinations thereof.

Each thermal transfer sheet 26 may have an in-plane thermal conductivity of greater than about 250 W/mK at about room temperature (using the Angstrom method to test at room temperature being approximately 25° C.). In another embodiment the in-plane thermal conductivity of thermal transfer sheet 26 is at least about 400 W/mK. In yet a further embodiment, the in-plane thermal conductivity of thermal transfer sheet 26 may be at least about 550 W/mK. In additional embodiments, the in-plane thermal conductivity may range from at least 250 W/mK to at least about 1500 W/mK. It is further preferred that at least one of the thermal transfer sheets has an in-plane thermal conductivity of at least about twice the in-plane thermal conductivity of aluminum. Furthermore, each thermal transfer sheet 26 may have the same or different in-plane thermal conductivities. Any combination of the above in-plane thermal conductivities may be practiced. In one embodiment, the graphite sheet material may be from 10 to 1500 microns thick. In other embodiments the graphite sheet material may be from 20 to 40 microns thick. Suitable graphite sheets and sheet making processes are disclosed in, for example, U.S. Pat. Nos. 5,091,025 and 3,404,061, the contents of which are incorporated herein by reference.

In an optional embodiment, one or more thermal transfer sheets 26 may be resin reinforced. The resin may be used, for example, to improve the rigidity of the thermal transfer sheet 26 and/or the impermeability of thermal transfer sheet 26. In combination with resin reinforcement, or in the alternative, one or more thermal transfer sheets 26 may include carbon and/or graphite fiber reinforcement. Preferably, thermal transfer sheet 26 may include a sufficient amount of reinforcement to assist with or provide structural integrity to thermal transfer sheet 26.

Thermal transfer sheet 26 is a more conformable material than conventional materials used in a pack for heat spreading (ex. aluminum). Use of thermal transfer sheet 26 offers a reduction in interfacial thermal heat transfer resistance between thermal transfer sheet 26 and cell 16 as compared to cell 16 and a conventional material for the thermal transfer sheet. Because thermal transfer sheet 26 is more conformable, interfacial thermal heat transfer between cells 16 having non-flat major surfaces is better than conventional materials. The conformability and the resulting reduction in interfacial thermal heat transfer resistance can reduce or even eliminate the need to apply a thermally conductive grease or paste to the surface of the thermal transfer sheet 26, as is commonly practiced to overcome the interfacial resistance of conventional materials.

If inter-cell electrical isolation is desired, thermal transfer sheet 26 may optionally be coated with an electrically insulating film on one or both major surfaces, wherein the film is substantially thin enough not to appreciably impede heat transfer to the thermal transfer sheet 26. Exemplary films include PET and polyimide films. Thermal transfer sheets may further include a surface treatment such as corrugation or knurling to help reduce the minimum possible bend radius without substantially reducing the thermal conductivity thereof.

Thermal transfer sheet 26 may optionally be coated with a film adhesive on one or both major surfaces, wherein the adhesive layer is thin enough not to appreciably impede heat transfer to the thermal transfer sheet. The use of thermal transfer sheets 26 incorporating an adhesive layer and supplied on a release liner can simplify the assembly of the battery pack by enabling "peel and stick" application to individual battery cells. Additionally, battery packs assembled with thermal transfer sheet 26 incorporating the film adhesive may reduce or substantially eliminate the need for potting compounds (such as silicone or polyurethane) used to prevent cells from shifting under inertial forces and vibration, as is commonly practiced in battery pack constructions incorporating conventional thermal transfer materials.

In one embodiment, at least one of the spaces between adjacent thermal transfer sheets 26 or between the thermal transfer sheet 26 and an adjacent cell 16 may be at least partially filled with a layer of a phase change material. In another embodiment at least one of the spaces between adjacent thermal transfer sheets 26 or between the thermal transfer sheet 26 and an adjacent cell 16 is completely filled with a layer of a phase change material. In these or other embodiments, substantially all of the spaces between the thermal transfer sheets 26 or between the thermal transfer sheets 26 and the adjacent cells 16 includes a phase change material. The phase change material may be free flowing and contained or bound at least partially by the thermal transfer sheets 26. Alternately, the phase change material may be physically adsorbed into a carrying matrix. For example, the phase change material may be absorbed and carried in a compressed expanded graphite mat or carbon foam. The phase change material would help reduce the magnitude and speed of temperature changes in the battery pack. The melting temperature range of the phase change material may advantageously be approximately equal to the recommended operating temperature range for the battery cells within the battery pack. An example of a suitable phase change material is a paraffin wax.

In any one or more of the above embodiments, the thermal transfer sheet 26 may further be a composite material. For example, each thermal transfer sheet may include a pair of graphite sheets having a phase change material disposed therebetween. The phase change material may be free flowing and contained or bound by the graphite sheets. Alternately, the phase change material may be physically adsorbed into a carrying matrix that is positioned between the opposed graphite sheets. For example, the phase change material may be absorbed and carried in compressed expanded graphite mat or carbon foam. In the alternative, the composite material may include a single graphite sheet layer secured to a single carrying matrix layer having the phase change material absorbed therein. In still other embodiments, thermal transfer sheet 26 may include a single layer of graphite sheet material having the phase change material absorbed therein.

Each thermal transfer sheet 26 extends upwardly from the stack of cells 16. As shown in FIG. 3 an air gap is formed between the cell stacks and the cover plate 18. However, it should be appreciated that this gap may be filled with insulative or other material. Further, housing 12 and cover plate 18 may be configured and sized to eliminate the air gap. In any event, the thermal transfer sheets 26 extend upwardly from the cell stack(s) and through guide apertures 30 that are sized to allow one or more thermal transfer sheets 26 to extend therethrough. In one embodiment, a single guide aperture 30 is provided for each thermal transfer sheet 26. In other embodiments, a single guide aperture 30 may receive two or more thermal transfer sheets 26 therethrough.

Figure 5:
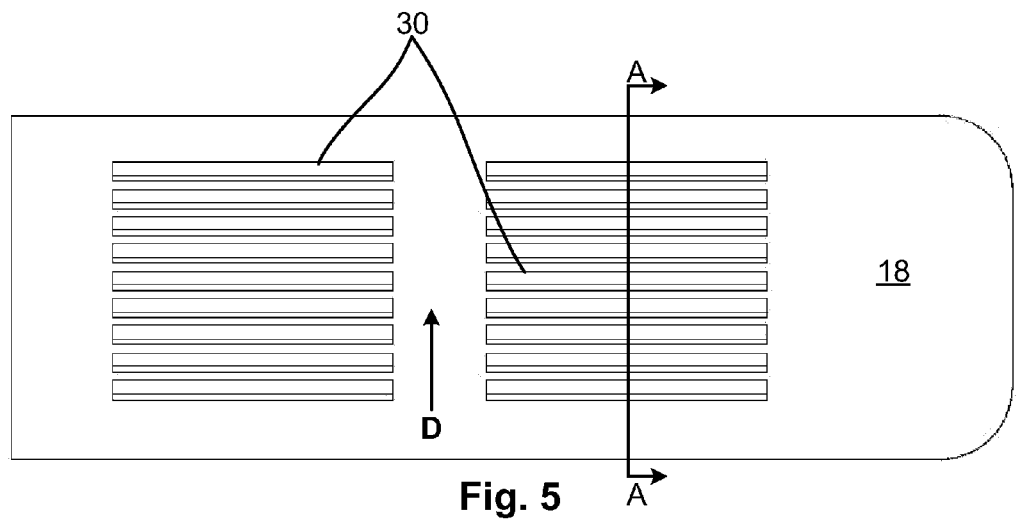
FIG. 5 is a top view of the cover plate.
Figure 6:
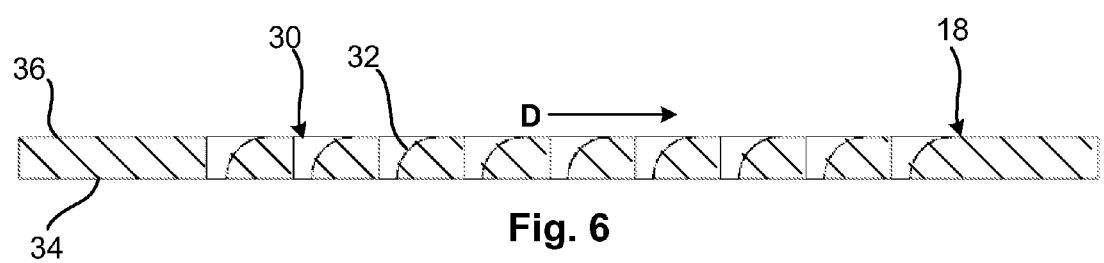
FIG. 6 is a side section view along A-A of FIG. 5.
Figure 7:
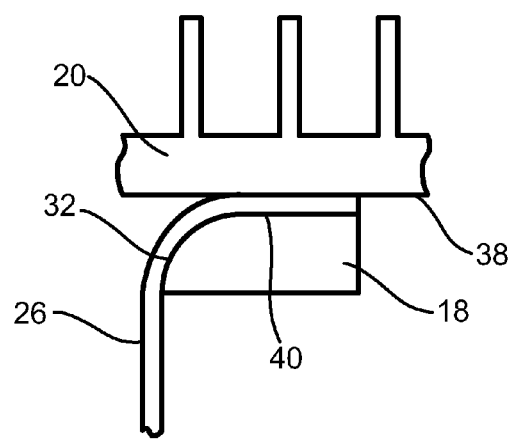
FIG. 7 is an enlarged partial section view of the cover plate, heat sink and thermal transfer sheet.

With reference now to FIGS. 5-7, it can be seen that guide apertures 30 include a curved sidewall 32. In one or more embodiments, the curved sidewall 32 extends from generally perpendicular to the bottom face 34 of cover plate 18 to generally parallel to the top face 36 of cover plate 18. In one embodiment the radius of curved sidewall 32 may be from between about 1 mm and about 10 mm. In other embodiments the radius may be from between about 1 mm and about 5 mm. In these or other embodiments, the radius may be less than about 10 mm. In other embodiments, the radius is less than about 5 mm. The radius of curved sidewall 32 should be greater than the minimum bend radius of the thermal transfer sheet 26 to prevent cracking of the thermal transfer sheet. Thermal conductivity is enhanced by advantageously maintaining the graphite sheet in a contiguous form, without cracks or other disruptions to structure.

Within the guide apertures 30 the thermal transfer sheet 26 may be bent from a configuration generally perpendicular to bottom face 34 of cover plate 18 to a configuration generally parallel to, and flush with the top face 36 of cover plate 18. Thermal transfer sheet 26 is thereby positioned between the bottom surface 38 heat sink 20 and the top face 36 of cover plate 18. Thus, thermal transfer sheet 26 is in operative thermal contact with at least one major surface of a battery cell 16 and further with the bottom surface 38 of heat sink 20. In this manner, thermal transfer sheet 26 may efficiently spread and conduct thermal energy from the battery cells 16 to the heat sink 20 where it may be thereafter may be transferred to ambient air or otherwise removed.

The above battery pack assembly 10 may be advantageously assembled according to the following method. The cells 16 and thermal transfer sheets 26 may be positioned inside housing 12 with the thermal transfer sheets 26 extending upwardly. The cover plate 18 may be positioned so that the upwardly extending thermal transfer sheets 26 are aligned with guide apertures 30. The cover plate 18 may be lowered onto housing 12 so that thermal transfer sheets 26 extend upwardly through guide apertures 30, perpendicular to both bottom and top faces 34 and 36 of cover plate 18. Because of the relative flexibility of the thermal transfer sheet 26, they may be bent in-situ. Thus, in one embodiment the thermal transfer sheets 26 may be bent simultaneously with the installation of heat sink 20 onto cover plate 18. This may be accomplished by first positioning the heat sink in proximity with the top surface 36 of cover plate 18. Heat sink 20 may be moved in the "D" direction, thus contacting the thermal transfer sheets 26 and bending them flat against top surface 36 of cover plate 20. Once in final position, the heat sink 20 may then be secured to cover plate 18.

In an alternate embodiment, one surface of thermal transfer sheet 26 includes an adhesive coating 40. Instead of bending the thermal transfer sheet 26 during the installation of the heat sink 20, the thermal transfer sheets 26 may be bent over curved sidewall 32 by a mandrel or other object and held in place when the adhesive coating 40 contacts the curved sidewall 32 and top surface 36. Thereafter, the heat sink 20 may be installed directly onto the bent thermal transfer sheets 26.

It should be appreciated that, though the above disclosure includes all heat sinks position on a single side of the battery pack assembly, the heat sinks might be positioned at one more than one side. In such an embodiment, the thermal transfer sheets may be positioned and sized to extend whatever side the respective heat sink is positioned.

It should be appreciated that, though the above disclosure focuses on the removal of excess heat from the battery cell stack, thermal management may also encompass adding heat to the stack. For example, cells that are too cold have low discharge rates and should therefore be warmed prior to recharging, otherwise cell damage may result. The embodiments disclosed hereinabove may facilitate such a heating function if, for example, a heat source in thermal contact with the heat sink, essentially reversing direction of heat flow. Alternately, a heat source may be places in another location, and the heat spreading functionality of the thermal transfer sheet would improve heating uniformity and therefore performance.

The disclosures of all cited patents and publications referred to in this application are incorporated herein by reference in their entirety. The various embodiments disclosed herein may be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A battery pack thermal management assembly for drawing heat from a plurality of generally rectangular prismatic batteries having opposed major surfaces and arranged in a stacked configuration inside a housing, the battery pack thermal management assembly comprising;
   a plurality of thermal transfer sheets made from sheets of a compressed mass of exfoliated graphite particles, each said thermal transfer sheet being positioned to contact the major surface of at least one of the prismatic batteries;
   a cover plate having a to face and a bottom face and including a plurality of apertures through which the plurality of thermal transfer sheets extend, said apertures including at least one curved sidewall, said thermal transfer sheets being bent over said curved sidewall; and
   a heat sink positioned on top of said cover plate, at least a portion of each of said thermal transfer sheets being secured between said heat sink and said top face.

2. The battery pack thermal management assembly of claim 1 wherein said thermal transfer sheets extend into said apertures substantially perpendicular from said bottom face and substantially parallel to said top face.

3. The battery pack thermal management assembly of claim 1 wherein said curved sidewall includes a radius between about 1 mm and about 10 mm.

4. The battery pack thermal management assembly of claim 1 wherein said curved sidewall includes a radius of between about 2 mm and about 5 mm.

5. The battery pack thermal management assembly of claim 1 wherein said sheet of a compressed mass of exfoliated graphite panicles includes an in-plane thermal conductivity of at least about 250 W/mK.

6. The battery pack thermal management assembly of claim 1 wherein said sheet of a compressed mass of exfoliated graphite particles includes an in-plane thermal conductivity of at least about 400 W/mK.

7. The battery pack thermal management assembly of claim 1 wherein one of said plurality of thermal transfer sheets is positioned between each pair of adjacent prismatic batteries in the stack.

8. The battery pack thermal management assembly of claim 1 wherein said heat sink is made of a thermally conductive metal and includes fins.

9. The battery pack thermal management assembly of claim 1 wherein said heat sink comprises a manifold through which a thermal transfer medium flows.

10. The battery pack thermal management assembly of claim 1 wherein said thermal transfer sheets comprise a minimum bend radius achievable without cracking said thermal transfer sheets, wherein the radius of said curved sidewall is greater than the minimum bend radius to prevent cracking of said thermal transfer sheet.

11. The battery pack thermal management assembly of claim 1 wherein each said apertures is sized and positioned to receive therethrough more than one of said plurality of thermal transfer sheets.

12. The battery pack thermal management assembly of claim 1 wherein said thermal transfer sheets are in contact with said curved sidewall.

13. The battery pack thermal management assembly of claim 1 wherein said thermal transfer sheets further comprise an adhesive coating contacting said curved surface and said top face.

14. The battery pack thermal management assembly of claim 1 wherein said thermal transfer sheets comprise composite materials.

15. The battery pack thermal management assembly of claim 14 wherein said thermal transfer sheets each comprise pairs of graphite sheets having a phase change material disposed therebetween.

16. The battery pack thermal management assembly of claim 15 wherein said phase change material is free flowing and contained by said graphite sheets.

17. The battery pack thermal management assembly of claim 15 wherein said thermal transfer sheets each comprise pairs of graphite sheets having a carrying matrix positioned therebetween, said carrying matrix comprising a compressed expanded graphite mat or a carbon foam, and wherein a phase change material is adsorbed into the carrying matrix.

18. The battery pack thermal management assembly of claim 14 wherein the composite material comprises a single graphite sheet layer secured to a single carrying matrix layer having a phase change material absorbed therein.

19. The battery pack thermal management assembly of claim 1 wherein said thermal transfer sheets have two major surfaces and further comprising an electrically insulating film on one or both major surfaces.

* * * * *